(12) United States Patent
Kubota et al.

(10) Patent No.: US 9,415,793 B2
(45) Date of Patent: Aug. 16, 2016

(54) STEERING APPARATUS

(71) Applicant: JTEKT CORPORATION, Osaka-shi, Osaka (JP)

(72) Inventors: Tatsuro Kubota, Shiki (JP); Yoshihito Yoshihara, Kashihara (JP); Eiji Tanaka, Kitakatsuragi-gun (JP); Tomonori Sugiura, Yamatokoriyama (JP); Ryota Okano, Hamamatsu (JP); Masayuki Nagaoka, Kashiba (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/895,407

(22) PCT Filed: Jul. 4, 2014

(86) PCT No.: PCT/JP2014/067877
§ 371 (c)(1),
(2) Date: Dec. 2, 2015

(87) PCT Pub. No.: WO2015/002288
PCT Pub. Date: Jan. 8, 2015

(65) Prior Publication Data
US 2016/0107676 A1    Apr. 21, 2016

(30) Foreign Application Priority Data

Jul. 5, 2013 (JP) .................................. 2013-141989

(51) Int. Cl.
*B62D 1/184* (2006.01)
(52) U.S. Cl.
CPC ..................................... *B62D 1/184* (2013.01)

(58) Field of Classification Search
CPC ...................................................... B62D 1/184
See application file for complete search history.

(56) References Cited

U.S. PATENT DOCUMENTS 5,088,767 A    2/1992    Hoblingre et al.
5,213,004 A *  5/1993    Hoblingre .............. B62D 1/184
                                                    403/92

(Continued)

FOREIGN PATENT DOCUMENTS

| JP | 2007091210 A | 4/2007 |
| JP | 2010528935 A | 8/2010 |
| WO | 2004089722 A1 | 10/2004 |

OTHER PUBLICATIONS

Sep. 22, 2014 International Search Report issued in International Patent Application No. PCT/JP2014/067877.

(Continued)

*Primary Examiner* — Darlene Condra
(74) *Attorney, Agent, or Firm* — Oliff PLC

(57) ABSTRACT

A steering apparatus includes a first member which rotates together with an operation lever which is operated to rotate and a third member which is supported rotatably via a friction reducing mechanism by a second member which is restricted from rotating. A cam mechanism which brings a fixed side plate into press contact with a column side plate includes an axially facing surface which is provided on the first member and on which a cam surface is formed, an axially facing surface which is provided on the third member, rolling elements which are interposed between both the axially facing surfaces, and a retainer which holds the rolling elements and which is restricted from rotating by the second member.

8 Claims, 15 Drawing Sheets

(56) References Cited

U.S. PATENT DOCUMENTS

| | | | |
|---|---|---|---|
| 5,392,667 A | 2/1995 | Courvoisier | |
| 5,394,767 A | 3/1995 | Hoblingre et al. | |
| 5,921,577 A * | 7/1999 | Weiss | B62D 1/184 280/775 |
| 6,450,531 B1 * | 9/2002 | Rinker | B62D 1/184 280/775 |
| 7,415,908 B2 * | 8/2008 | Zernickel | B62D 1/184 280/775 |
| 7,878,543 B2 | 2/2011 | Bodtker et al. | |
| 2002/0084644 A1 | 7/2002 | Rinker et al. | |
| 2005/0178231 A1 * | 8/2005 | Schick | B62D 1/184 74/493 |
| 2006/0273567 A1 * | 12/2006 | Fix | B62D 1/184 280/775 |
| 2007/0068310 A1 | 3/2007 | Arihara | |
| 2009/0019963 A1 | 1/2009 | Hubrecht et al. | |
| 2010/0170364 A1 | 7/2010 | Bertet et al. | |
| 2012/0186384 A1 * | 7/2012 | Minamigata | B62D 1/195 74/492 |
| 2014/0252753 A1 * | 9/2014 | Schnitzer | B62D 1/184 280/775 |
| 2014/0305251 A1 * | 10/2014 | Wilkes | B62D 1/184 74/493 |
| 2014/0373663 A1 * | 12/2014 | Hahn | B62D 1/184 74/493 |

OTHER PUBLICATIONS

Jan. 5, 2016 International Preliminary Report on Patentability issued in International Patent Application No. PCT/JP2014/067877.

May 18, 2016 Search Report issued in European Patent Application No. 14820277.3.

* cited by examiner

STEERING APPARATUS

TECHNICAL FIELD

The present invention relates to a steering apparatus.

BACKGROUND ART

There is a position adjustable steering apparatus in which the position of a steering wheel can be changed according to the build or driving posture of a driver.

For example, in Patent Literature 1, after the position of a steering wheel is adjusted, an operation lever is operated to rotate so that a movable cam rotates relative to a fixed cam.

The movable cam which rotates moves balls on a spiral fixed rolling path on the fixed cam and a spiral movable rolling path on the movable cam to move the fixed cam in an axial direction.

This fastens together side plates fixed to the body and slide plates fixed to the steering column to attain the locking of the steering wheel in a desired position.

CITATION LIST

Patent Literature

[Patent Literature 1] JP-A-2010-528935

SUMMARY OF THE INVENTION

Technical Problem

However, although the balls roll relative to either of the fixed cam and the movable cam, there are fears that the balls slip relative to the other.

As this occurs, the operating effort to operate the operation lever has to be increased.

Then, an object of the invention is to provide a steering apparatus which can reduce the operating effort to operate an operation lever.

Solution to Problem

With a view to achieving the object, an invention provides a steering apparatus (1) comprising:
a fixed side plate (26, 27) which is fixed to a body (14);
a column side plate (23, 24) which is fixed to a steering column (8) which supports a steering shaft (4) rotatably;
a fastening shaft (35) which is inserted through fastening shaft insertion slots (34, 33) which are respectively provided in the fixed side plate and the column side plate;
an operation lever (20) which is operated to rotate about a center axis (C1) of the fastening shaft;
a first member (37) which is supported by the fastening shaft and which rotates about the center axis together with the operation lever;
a second member (38) which is supported by the fastening shaft and which is restricted from rotating by the fastening shaft insertion slots;
a third member (70) which is supported by the fastening shaft and which is interposed between the first member and the second member;
a friction reducing mechanism (80; LUB; CTL) which is interposed between the second member and the third member and which thrust supports the third member so that the third member rotates relative to the second member; and
a cam mechanism (40) which attains locking by fastening the fixed side plates to the column side plates and which includes
a pair of axially facing surfaces (37a, 70a) which are provided on the first member and the third member and which face each other in an axial direction (Y1) of the fastening shaft,
a cam surface (44) which is formed on the axially facing surface of the first member,
a plurality of rolling elements (41) which roll between both the axially facing surfaces in association with a relative rotation of the first member and the third member, and
a retainer (42) which holds the rolling elements and which is restricted from rotating about the center axis by the second member,
wherein the friction reducing mechanism functions to make a rotating resistance of the third member relative to the second member smaller than a reaction force which the third member receives as a result of a rolling resistance of the rolling elements.

An invention provides a steering apparatus (1) comprising:
a fixed side plate (26, 27) which is fixed to a body (14);
a column side plates (23, 24) which is fixed to a steering column (8) which supports a steering shaft (4) rotatably;
a fastening shaft (35) which is inserted through fastening shaft insertion slots (34, 33) which are respectively provided in the fixed side plate and the column side plate;
an operation lever (20) which is operated to rotate about a center axis (C1) of the fastening shaft;
a first member (37P) which is supported by the fastening shaft and which rotates about the center axis together with the operation lever;
a second member (38P) which is supported by the fastening shaft and which is restricted from rotating by the fastening shaft insertion slots;
a third member (70P) which is supported by the fastening shaft and which is interposed between the first member and the second member;
a friction reducing mechanism (80; LUB; CTL) which is interposed between the first member and the third member and which thrust supports one of the first member and the third member so that the third member rotates relative to the other; and
a cam mechanism (40P) which attains locking by fastening the fixed side plates to the column side plates and which includes
a pair of axially facing surfaces (48Pb, 70a) which are provided on the second member and the third member and which face each other in an axial direction of the fastening shaft,
a cam surface (44P) which is formed on the axially facing surface of the second member,
a plurality of rolling elements (41) which roll between both the axially facing surfaces in association with a relative rotation of the second member and the third member, and
a retainer (42) which holds the rolling elements and which rotates together with the first member,
wherein the friction reducing mechanism functions to make a relative rotating resistance between the first member and the third member smaller than a reaction force which the third member receives as a result of a rolling resistance of the rolling elements.

The parenthesized numerals denote corresponding constituent elements or the like in embodiments which will be described later, which does not, of course, mean that the invention is to be limited to those embodiments.

Hereinafter, this will be true in this clause.

As will be described, the friction reducing mechanism may be a thrust bearing (80).

As will be described, the friction reducing mechanism may be a lubricant (LUB).

As will be described, the friction reducing mechanism may be a coating layer (CTL) of a low friction material.

Advantageous Effect of the Invention

According to the invention, the retainer which holds the rolling elements is restricted from rotating about the center axis of the fastening shaft. Additionally, the friction reducing mechanism functions to make the rotating resistance of the third member relative to the second member smaller than the reaction force which the third member receives as a result of the rolling resistance of the rolling elements.

Consequently, when the operation lever is rotated, the first member rotates together with the operation lever, and the rolling elements roll on the cam surface of the first member, while the third member which is supported rotatably via the friction reducing mechanism by the second member which is restricted from rotating rotates in an opposite direction to the rotating direction of the first member, whereby the rolling elements are allowed to roll on the first member and the third member in an ensured fashion.

As a result, the operating effort to operate the operation lever can be reduced.

According to the invention, the retainer which holds the rolling elements rotates together with the first member, and the rolling elements roll on the cam surface of the second member.

Additionally, the friction reducing mechanism functions to make the rolling resistance of the third member relative to the first member smaller than the reaction force which the third member receives as a result of the rolling resistance of the rolling elements.

Consequently, when the operation lever is rotated, the first member rotates together with the operation lever, while the friction reducing mechanism which is interposed between the first member and the third member permits the relative rotation between the first member and the third member, whereby the rolling elements are allowed to roll on the first member and the third member in an ensured fashion.

As a result, the operating effort to operate the operation lever can be reduced.

According to the invention, the friction resistance can be reduced remarkably by the thrust bearing which functions as the friction reducing mechanism.

According to the invention, the friction resistance can be reduced remarkably by the lubricant which functions as the friction reducing mechanism.

According to the invention, the friction resistance can be reduced remarkably by the coating layer of the low friction material which functions as the friction reducing mechanism.

DESCRIPTION OF EMBODIMENT

Figure 1:
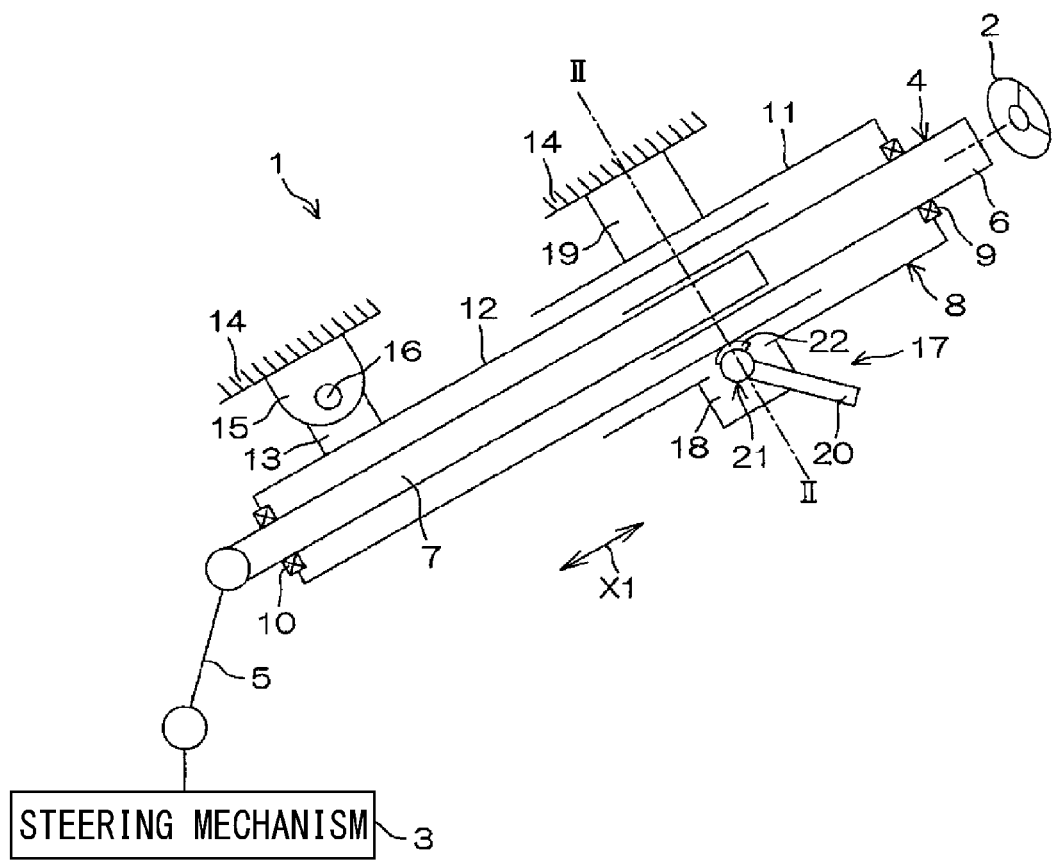
FIG. 1 is a schematic diagram showing schematically the configuration of a steering apparatus of a first embodiment of the invention.

Hereinafter, referring to the drawings, embodiments of the invention will be described specifically.

FIG. 1 is a schematic diagram showing schematically the configuration of a position adjustable steering apparatus 1 of a first embodiment of the invention.

Referring to FIG. 1, the steering apparatus 1 includes a steering member 2 such as a steering wheel and a steering mechanism 3 which turns steered wheels (not shown) in association with the turning of the steering member 2.

A rack-and-pinion mechanism, for example, is used as the steering mechanism 3.

The steering member 2 and the steering mechanism 3 are mechanically connected together via a steering shaft 4 as a steering shaft, an intermediate shaft 5 and the like.

The rotation of the steering member 2 is transmitted to the steering mechanism 3 via the steering shaft 4, the intermediate shaft 5 and the like.

The rotation transmitted to the steering mechanism 3 is converted to an axial motion of a rack shaft, not shown.

This turns the steered wheels.

The steering shaft 4 has a tubular upper shaft 6 and a lower shaft 7 which are fitted together through spline fitting or serration fitting, for example, so as to slide relatively.

The steering member 2 is connected to one end of the upper shaft 6.

The steering shaft 4 can extend and contract in an axial direction X1 thereof.

The steering shaft 4 is inserted through a tubular steering column 8 and is supported via a plurality of bearings 9, 10 by the steering column 8 so as to rotate therein.

The steering column 8 has an outer tube 11 which functions as an upper tube and an inner tube 12 which functions as a lower tube.

Both the tubes 11, 12 are fitted together so as to slide relatively in their axial direction.

This allows the steering column 8 to extend and contract in its axial direction, which enables the steering column 8 to execute a telescopic adjustment which will be described later.

The outer tube 11 supports the upper shaft 6 rotatably via the bearing 9.

Additionally, the outer tube 11 is connected to upper shaft 6 via the bearing 9 so as to move together therewith in the axial direction X1 of the steering shaft 4.

A lower column bracket 13 is fixed to an outer circumference of the inner tube 12.

The lower column bracket 13 is supported rotatably on a lower fixed bracket 15 which is fixed to the body 14 via a tilt center shaft 16.

The steering column 8 and the steering shaft 4 can rotate about the tilt center shaft 16.

The steering member 2 can adjust its position in a height direction by rotating the steering shaft 4 and the steering column 8 about the tilt center shaft 16 (a so-called tilt adjustment).

Additionally, the steering member 2 can adjust its position in a front-to-rear direction as well as the height direction by extending and contracting the steering shaft 4 and the steering column 8 in the axial direction X1 (the so-called telescopic adjustment).

The steering apparatus 1 includes a fastening mechanism 17 which attains a tilting lock and a telescoping lock so as to fix the position of the steering member 2 whose height is now adjusted in place.

Specifically, an upper column bracket 18 which functions as a movable bracket is fixed to the outer tube 11.

The tilting lock and the telescoping lock are attained by connecting the upper column bracket 18 to an upper fixed bracket 19 which is fixed to the body 14 by the fastening mechanism 17.

As a result, the position of the steering column 8 is fixed in place relative to the body 14, whereby the position of the steering member 2 is fixed in place.

Additionally, the fastening mechanism 17 functions to suppress shakiness produced between both the tubes 11, 12 in which the telescoping lock has been attained.

Specifically, the fastening mechanism 17 includes a sleeve 21 which rotates as the operation lever 20 is operated to rotate and a pressing portion 22 which is made up of a cam-shaped projection and which is provided on an outer circumference of the sleeve 21 so as to rotate together therewith.

The pressing portion 22 pressing the inner tube 12 upwards as a result of the sleeve 21 rotating by operating the operation lever 20.

This causes the inner tube 12 to be pressed against the outer tube 11 in a radial direction so as to suppress the radial shakiness of the inner tube 12 relative to the outer tube 11.

Figure 2:
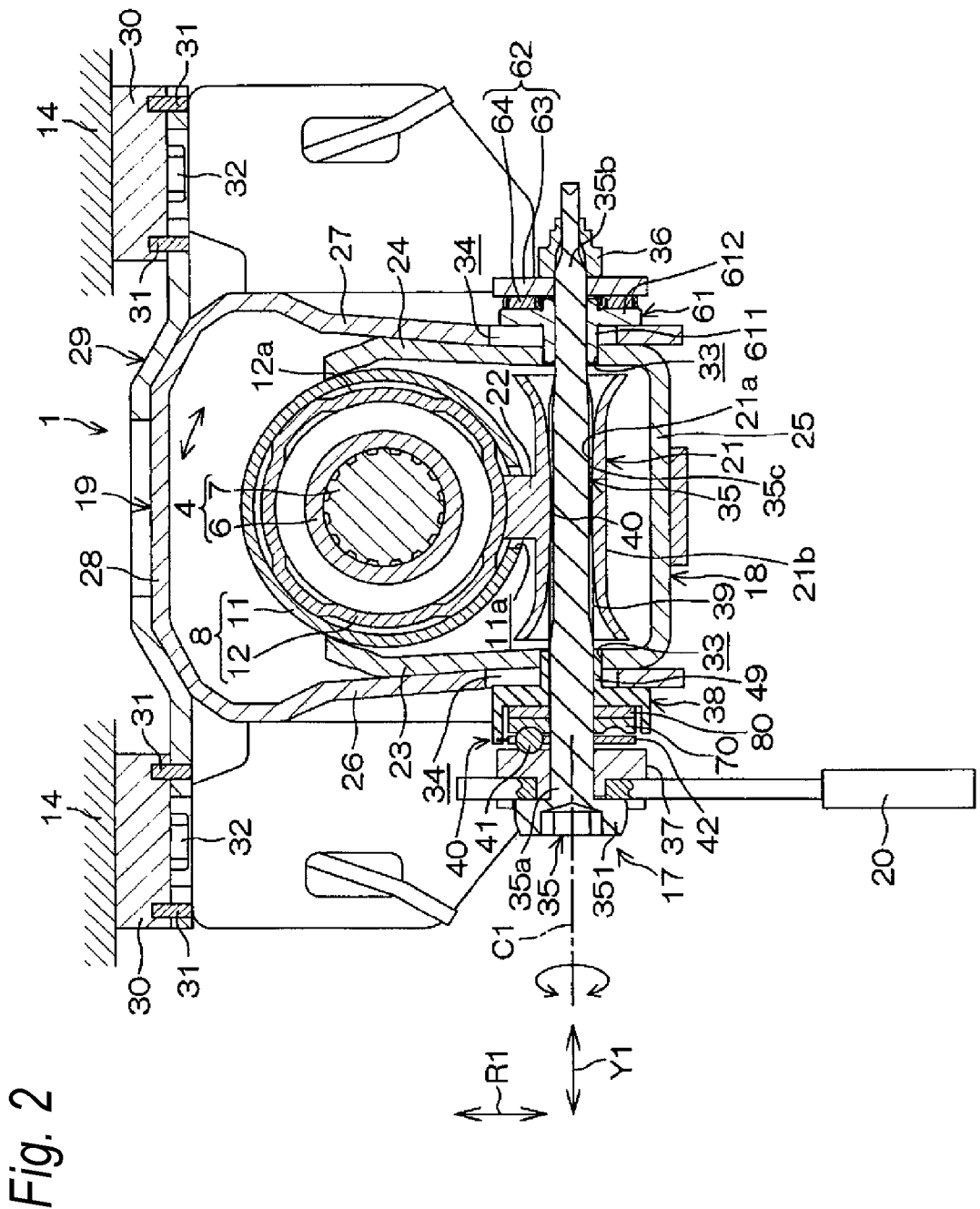
FIG. 2 is a sectional view illustrating the steering apparatus which is taken along a line II-II in FIG. 1.

FIG. 2 is a sectional view illustrating the steering apparatus 1 which is taken along a line II-II in FIG. 1.

Referring to FIG. 2, the upper column bracket 18 is a groove-like member which opens upwards and is formed symmetric laterally.

Namely, the upper column bracket 18 includes a pair of column side plates 23, 24 which are fixed individually to an outer circumference of the outer tube 11 at one end thereof and a connection plate 25 which connects the pair of column side plates 23, 24 at the other end thereof.

The upper fixed bracket 19 is a groove-like member as a whole which opens downwards and is formed symmetric laterally.

Namely, the upper fixed bracket 19 includes a pair of fixed side plates 26, 27 which face each other in a left-to-right direction, a connection plate 28 which connects the pair of fixed side plates 26, 27 at upper ends thereof, and a plate-shaped mounting stay 29 which is fixed to an upper surface of the connection plate 28 and which extends generally in the left-to-right direction.

In FIG. 2, the steering shaft 4, the steering column 8 and the upper column bracket 18 are disposed between the pair of fixed side plates 26, 27 of the upper fixed bracket 19.

The upper fixed bracket 19 is fixed to the body 14 via a pair of mount members 30 which are connected to the mount stay 29.

The mount members 30 and the mount stay 29 are connected together with synthetic resin pins 31 which penetrate the mount stay 29 in an up-to-down direction and which function as breakable connecting members. Then, the mount members 30 are fixed to the body 14 with fixing bolts 32.

Outer surfaces of the column side plates 23, 24 of the upper column bracket 18 extend to follow inner surfaces of the corresponding fixed side plates 26, 27 of the upper fixed bracket 19.

Horizontally elongated telescoping slots 33, which function as fastening shaft insertion slots, are formed individually in the pair of column side plates 23, 24 of the upper column bracket 18 so as to extend in a direction which is at right angles to the surface of a sheet of paper on which FIG. 2 is drawn (a direction corresponding to the axial direction X1).

Vertically elongated tilting slots 34, which function as fastening shaft insertion slots, are formed individually in the pair of fixed side plates 26, 27 of the upper fixed bracket 19.

The fastening mechanism 17 includes a fastening shaft 35 which is inserted through the tilting slots 34 in the fixed side plates 26, 27 and the telescoping slots 33 in the column side plates 23, 24, the operation lever 20 which is connected to the fastening shaft 35 so as to rotate together with a head portion 351 which is provided at one end 35a of the fastening shaft 35, a nut 36 which is screwed on a thread portion which is formed at the other end 35b of the fastening shaft 35, and a first interposed member 61 and a second interposed member 62 which fit on a portion of a shaft portion 35c which lies near the other end 35b of the fastening shaft 35 and which are interposed between the nut 36 and the other fixed side plate 27.

Additionally, the fastening mechanism 17 includes a first member 37 which fits on a portion of the shaft portion 35c which lies near the one end 35a of the fastening shaft 35 so as not to move in the axial direction and which rotates together with the operation lever 20, a second member 38 which fits on a portion of the shaft portion 35c which lies near the one end 35a of the fastening shaft 35 so as not only to rotate relative to the fastening shaft 35 but also to move in the axial direction and which is restricted from rotating by the tilting slot 34 in the fixed side plate 26, a third member 70 which is interposed between the first member 37 and the second member 38, a thrust bearing 80 which is interposed between the second member 38 and the third member 70 and which functions as a friction reducing mechanism, and a cam mechanism 40.

A thrust washer shown may be used as the thrust bearing 80. Alternatively, a thrust ball bearing or a thrust roller bearing may be used as the thrust bearing 80.

The cam mechanism 40 includes an axially facing surface 37a and an axial end face 70a which are provided on the first member 37 and the third member 70, respectively, and on at least one of which a cam surface 44 is formed, a plurality of balls 41 as rolling elements which roll between the axial end faces 37a, 70a, and a retainer 42 which holds the balls 41 and which is restricted from rotating about a center axis C1 by the second member 38.

The operation lever 20 is operated to rotate about the center axis C1 of the fastening shaft 35.

The cam mechanism 40 functions as a motion converting mechanism which converts the rotation of the first member 37 which is triggered in association with the rotation of the operation lever 20 to an axial movement of the third member 70 so as to press the fixed side plates 26, 27 individually against the corresponding column side plates 23, 24.

Here, the cam mechanism means a mechanical interlocking mechanism which imparts a predetermined motion (in this embodiment, a direct motion in an axial direction Y1 of the fastening shaft 35) to a driven portion (in this embodiment, corresponding to the third member 70) according to a surface configuration of a cam (in this embodiment, corresponding to the configuration of the cam surface 44).

As shown in FIG. 2, a spline (not shown) is provided on an inner circumference 21a of the sleeve 21, and this spline is brought into engagement with a spline 39 which is provided on an intermediate portion of the fastening shaft 35 in the axial direction Y1 thereof.

The sleeve 21 and the fastening shaft 35 are spline joined together, so that both the sleeve 21 and the fastening shaft 35 rotate together.

The pressing portion 22, which is made up of the cam-shaped projection as described above, is provided on an outer circumference 21b of the sleeve 21.

The pressing portion 22 passes through an insertion hole 11a which is provided in the outer tube 11 so as to press against an outer circumference 12a of the inner tube 12 as the sleeve 21 rotates.

Figure 3:
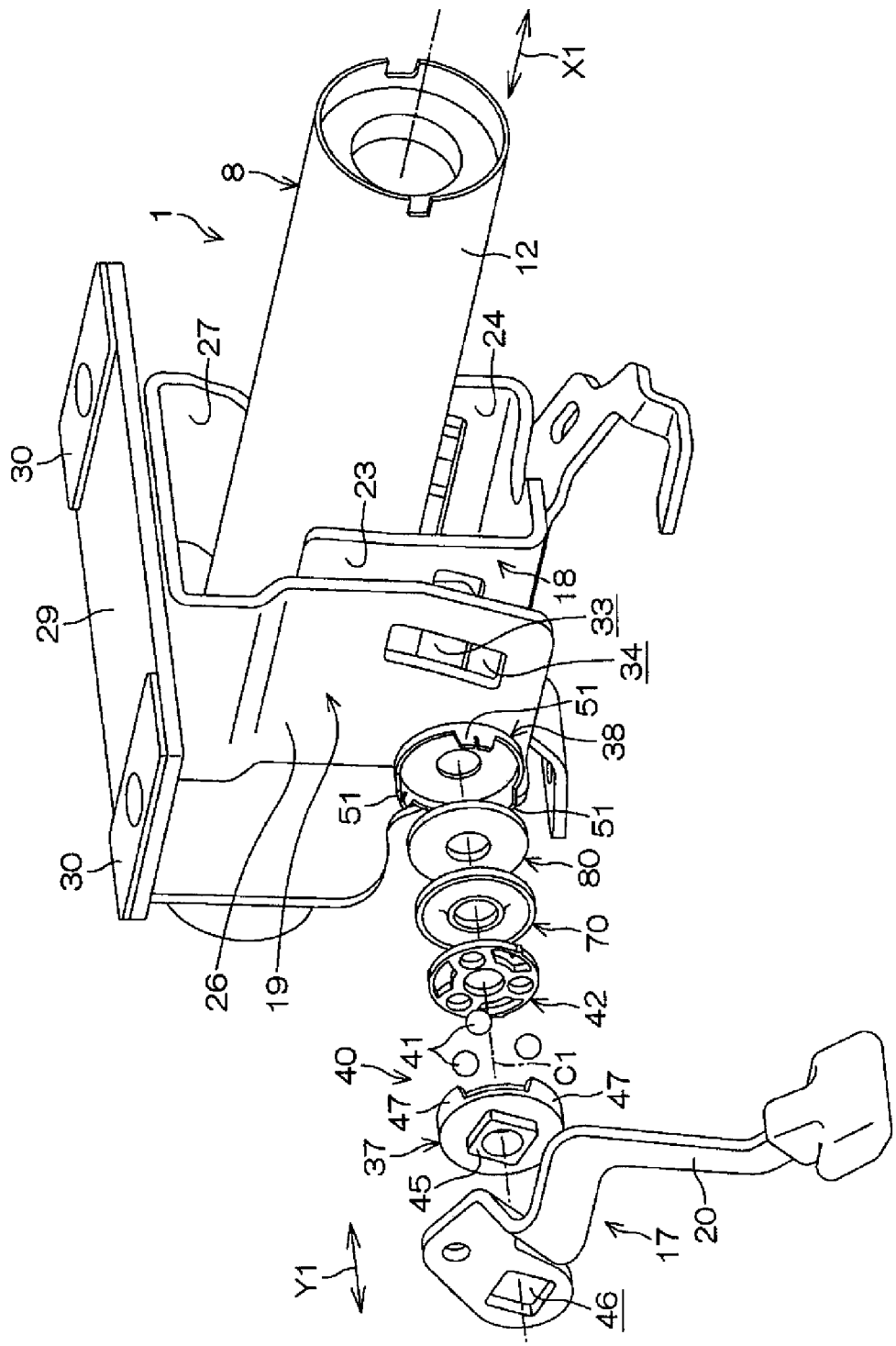
FIG. 3 is an exploded perspective view of the steering apparatus of the first embodiment.

As shown in FIG. 3, the first member 37 is made up of a holed circular disk.

Figure 5:
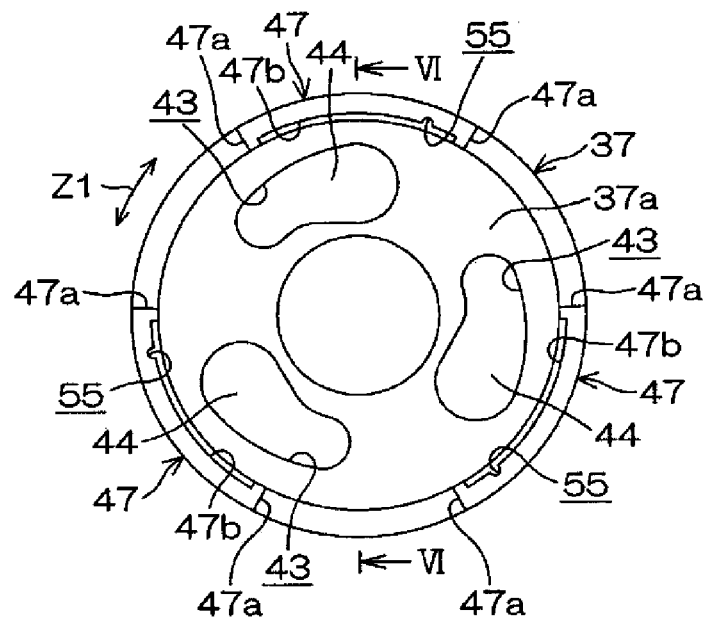
FIG. 5 is a view resulting when an inner surface of a first member of the first embodiment which functions as an axially facing surface is seen from a front thereof.

As shown in FIG. 5, a plurality of arc-shaped holding grooves 43 are formed on the axially facing surface 37a of the first member 37 so as to be spaced away from on another at equal intervals in a circumferential direction Z1, and these holding grooves 43 hold individually the balls 41.

Figure 6:
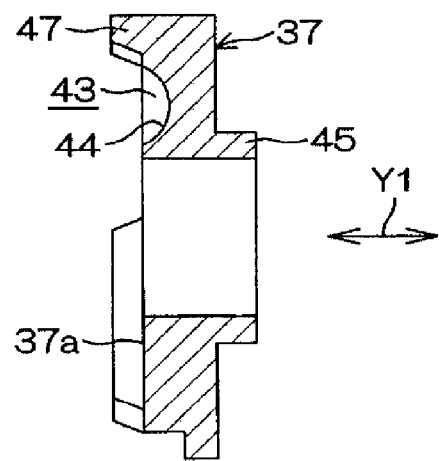
FIG. 6 is an axial sectional view of the first member of the first embodiment which shows a section taken along a line VI-VI in FIG. 5.
Figure 7:
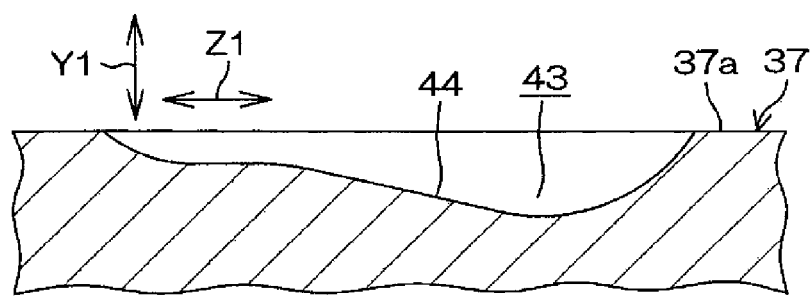
FIG. 7 is a sectional view of a holding groove of the first member of the first embodiment, which shows an outline of a cam surface.

As shown in FIGS. 5, 6 which is a sectional view taken along a line VI-VI in FIGS. 5 and 7 which is a circumferential sectional view of the first member 37, the cam surface 44 is formed on a bottom of each of the holding grooves 43, and the cam surface 44 rises in the axial direction Y1 as it extends in a circumferential direction Z1.

Figure 4:
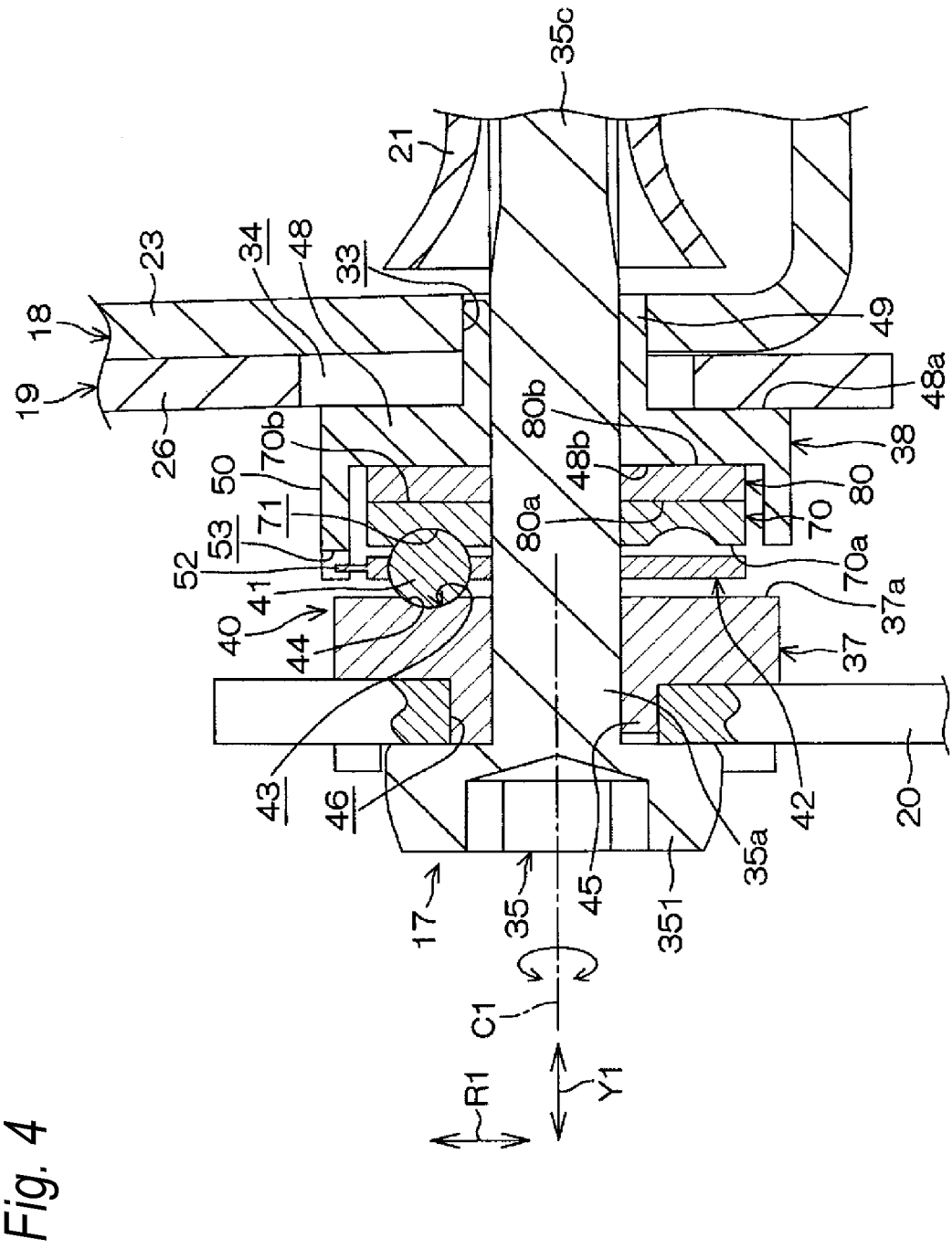
FIG. 4 is an enlarged sectional view of a fastening mechanism of the first embodiment and the periphery thereof, which corresponds to an enlarged view of part of FIG. 2.

As shown in FIGS. 4 and 6, a rectangular fitting projecting portion 45, for example, is provided on a rear surface of the axially facing surface 37a of the first member 37.

As shown in FIG. 4, the fitting projecting portion 45 is fitted in a fitting hole 46 in the operation lever 20, whereby the first member 37 is connected to the operation lever 20 so as to rotate together therewith.

As shown in FIG. 5, a plurality of first stoppers 47 are provided at equal intervals in the circumferential direction Z1 on a circumferential edge portion of the first member 37, and the first stoppers 47 are each made up a plurality of arc-shaped projections which project from the axially facing surface 37a towards the second member 38.

Each first stopper 47 has a pair of circumferential end faces 47a which function as stopper surfaces which face each other in the circumferential direction Z1.

Figure 17:
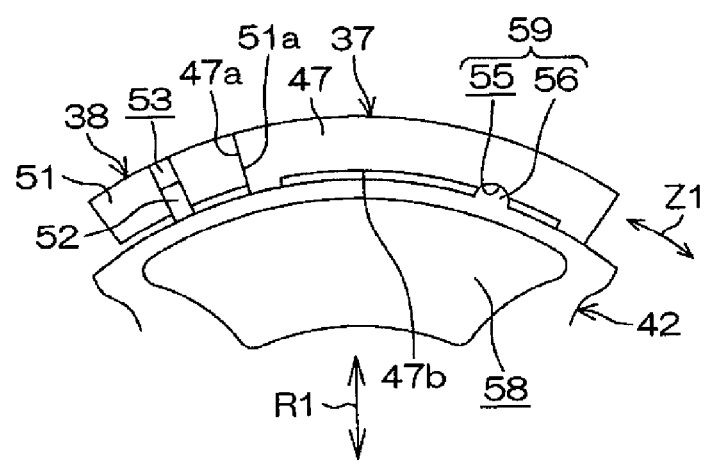
FIG. 17 is a schematic view of the first member and the retainer of the first embodiment, which shows a state in which when locking is attained by the cam mechanism, a projecting portion (an engaging portion) of the retainer fits in a recess portion (an engaged portion) of the first member to thereby restrict the relative rotation of the first member and the second member.

In the first stopper 47, as shown in FIG. 17, a recess portion 55, which functions as an engaged portion, is formed on a radially facing surface 47b which faces an outer circumference 42a (a radially facing surface) of the retainer 42, and a projecting portion 56 (refer to FIG. 13), which is provided on the outer circumference 42a of the retainer 42 to function as an engaging portion, is brought into engagement with the recess portion 55 when the cam mechanism 40 locks the steering shaft 4.

Figure 8:
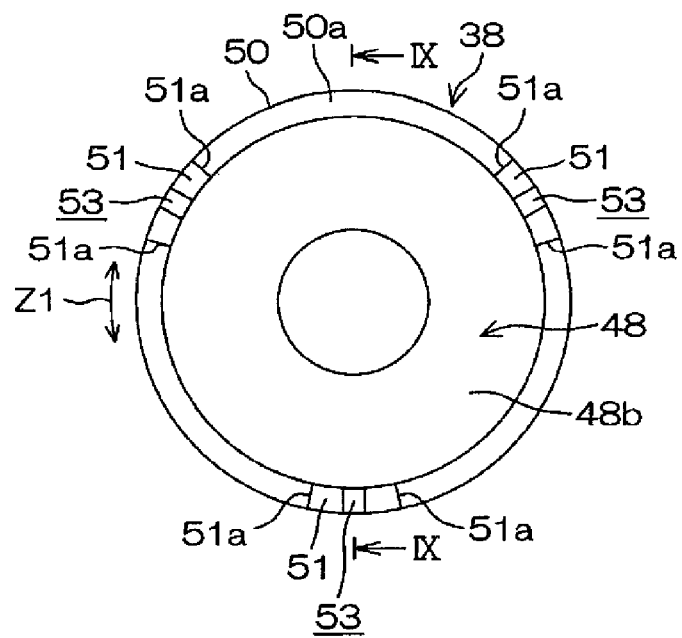
FIG. 8 is a view resulting when an outer surface of a second member of the first embodiment which functions as an axially facing surface is seen from a front thereof.
Figure 9:
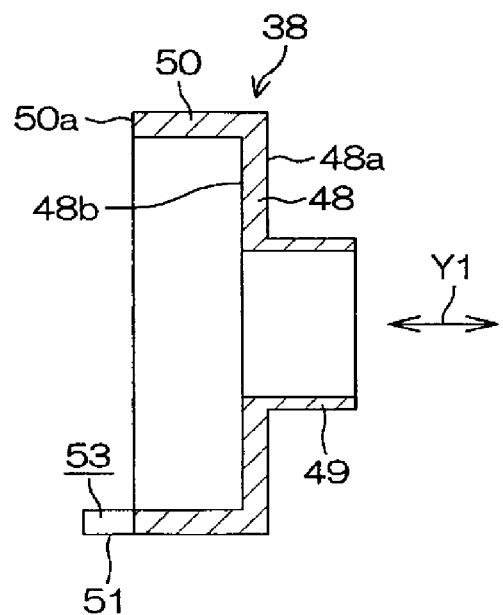
FIG. 9 is a sectional view of the second member, which shows a section taken along a line IX-IX in FIG. 8.

As shown in FIGS. 4, 8 and 9 which is a sectional view taken along a line IX-IX in FIG. 8, the second member 38 includes a holed disc-shaped main body 48 which has an annular fastening surface 48a which follows an outer surface of the fixed side plate 26 and a flat, annular seat surface 48b which lies on an opposite side to a side where the fastening surface 48a is provided to bear the thrust bearing 80, a tubular fitting projecting portion 49 which is formed on the fastening surface 48a and a circumferential side wall 50 which rises from a circumferential edge of the seat surface 48b in an opposite direction (towards the first member 37) to the fitting projecting portion 49.

As shown in FIG. 4, the fitting projecting portion 49 is fitted in the tilting slot 34 in the fixed side plate 26 of the upper fixed bracket 19 and the telescoping slot 33 in the column side plate 23 of the upper column bracket 18 so as to move along a direction in which each of the grooves 34, 33 extends.

A pair of flat surfaces (not shown) which define a width across flat therebetween, for example, are provided at a portion of the fitting projecting portion 49 which fits in the tilting slot 34 in the fixed side plate 26.

The second member 38 is restricted from rotating as a result of the fitting projecting portion 49 fitting in the tilting slot 34.

As shown in FIGS. 8 and 9, a plurality of projections 51 are provided on an axial end face of the circumferential side wall 50, and these projections 51 are disposed at equal intervals in a circumferential direction.

An engaging groove 53 is formed in each projection 51 so as to be brought into engagement with a corresponding engaging projection 52 (refer to FIG. 13) which is provided on the outer circumference of the retainer 42.

As shown in FIG. 17, the engaging projections 52 of the retainer 42 are brought into engagement with the corresponding engaging grooves 53 of the second member 38 which is restricted from rotating, whereby the retainer 42 is restricted from rotating about the center axis C1.

The projections 51 of the second member 38 function as second stoppers which cooperate with the first stoppers 47 of the first member 37 so as to control the rotation amount of the first member 37 relative to the second member 38.

Figure 16:
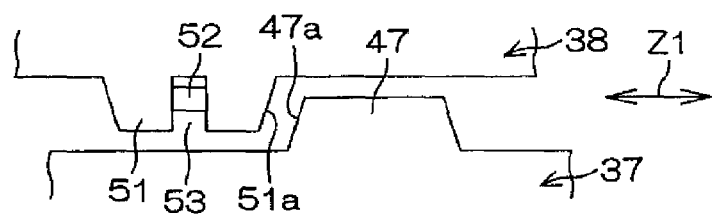
FIG. 16 is a schematic view of a first stopper and a second stopper which control a maximum value of a relative rotating amount of the first member and the second member in the first embodiment.

Namely, as shown in FIGS. 16 and 17 which are both schematic views, the first stoppers 47 and the second stoppers (the projections 51) are disposed alternately in the circumferential direction Z1.

A circumferential end face 47a (a stopper surface) of the first stopper 47 is brought into abutment with a circumferential end face 51a (a stopper surface) of the second stopper (the projection 51) which faces the circumferential end face 47a, whereby a maximum value of the rotation amount of the first member 37 relative to the second member 38.

Figure 13:
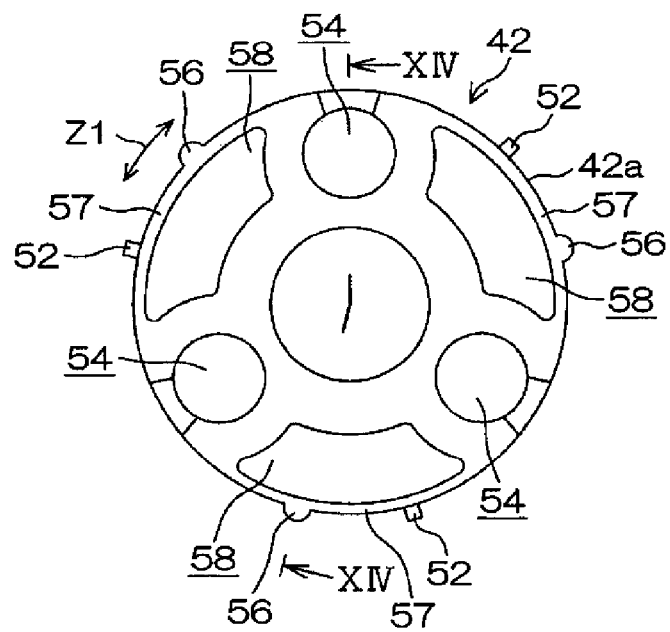
FIG. 13 is a front view of a retainer of the first embodiment.

As shown in FIG. 13, the retainer 42 is made up of a holed circular disc and is formed of a sheet of metal, for example, through pressing.

Figure 14:
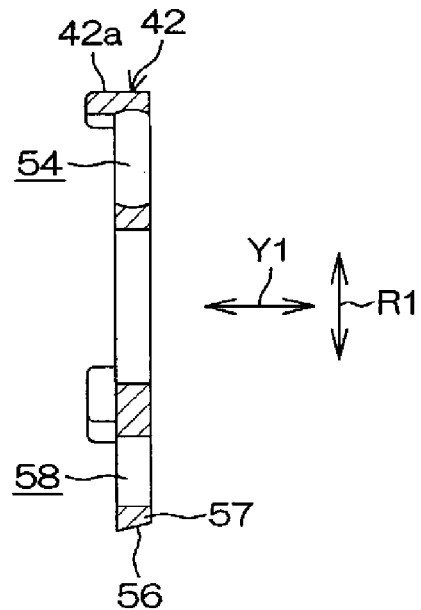
FIG. 14 is a sectional view of the retainer shown in FIG. 13, which shows a section taken along a line XIV-XIV in FIG. 13.
Figure 15:
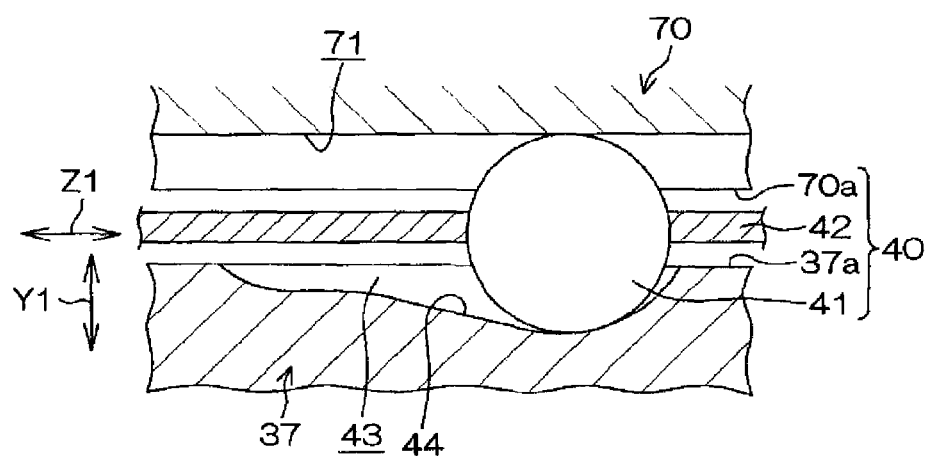
FIG. 15 is a schematic sectional view of a cam mechanism of the first embodiment.

As shown in FIGS. 13 and 14 which is a sectional view taken along a line XIV-XIV in FIG. 13, the retainer 42 includes pockets 54 which hold the corresponding balls 41 so as to roll.

One or a plurality of engaging projections 52 are provided on the outer circumference 42a (the radially facing surface) of the retainer 42 in such a way as to project outwards in the radial direction R1 so as to be brought into engagement with the engaging grooves 53 of the projections 51 of the second member 38.

The projecting portions 56 are provided on the outer circumference 42a of the retainer 42 so as to be brought into engagement with the recess portions 55 of the first stoppers 47 of the first member 37 to thereby restrict the relative rotation of the first member 37 and the second member 38 when the locking is attained.

As shown in FIG. 13, the projecting portions 56 are provided on flexible portions 57 which can elastically be displaced in the radial direction.

Specifically, in the retainer 42, the flexible portions 57 are formed between the projecting portions 56 and sectorial retainer's material removed through holes 58, for example, by providing the sectorial through holes 58 radially inwards of the projecting portions 56.

When the cam mechanism 40 locks the steering shaft 4, as shown in FIG. 17, the projecting portions 56 (the engaging portions) of the retainer 42 are brought into engagement with the corresponding recess portions 55 (the engaged portions) of the first stoppers 47 of the first member 37, whereby the first member 37 and the second member 38 are restricted from rotating relatively.

The projecting portions 56 and the recess portions 55 make up a relative rotation restricting mechanism 59.

Figure 10:
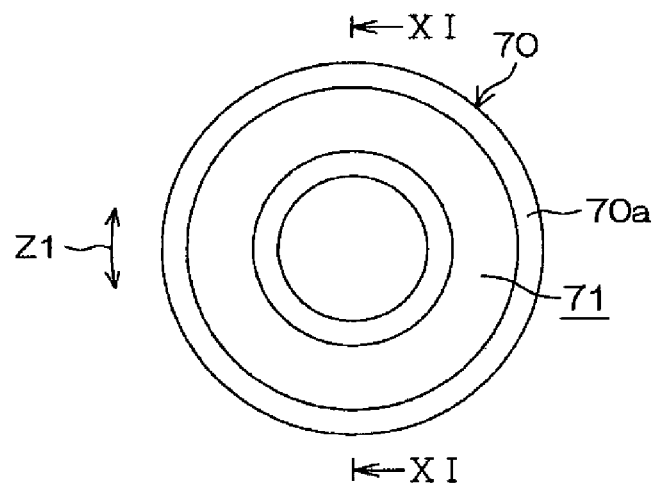
FIG. 10 is a front view of a third member of the first embodiment.
Figure 11:
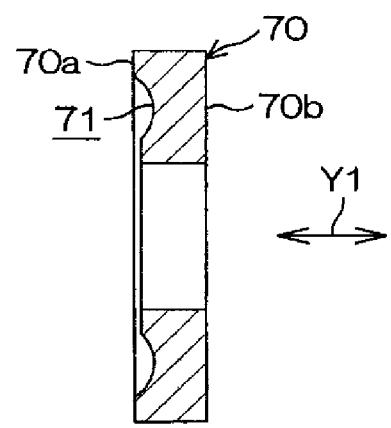
FIG. 11 is a sectional view of the third member of the first embodiment.

As shown in FIGS. 10 and 11 which is a sectional view taken along a line XI-XI in FIG. 10, the third member 70 is made up of a holed circular disc.

The third member 70 has a pair of axial end faces 70a, 70b which face each other in the axial direction.

As shown in FIG. 4, one axial end face 70a faces the axially facing surface 37a of the first member 37, and the other axial end face 70b faces the thrust bearing 80.

An annular guide groove 71 is formed on the axial end face 70a so as to guide the balls 41 which roll in the axial direction (corresponding to the rotational direction Z1).

Figure 12:
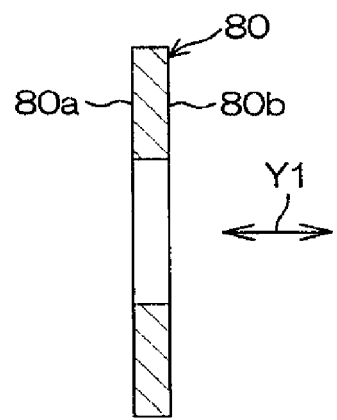
FIG. 12 is a sectional view of a thrust bearing of the first embodiment.

As shown in FIGS. 4 and 12, the thrust bearing 80 which functions as the friction reducing mechanism is a thrust washer, for example.

The thrust washer functioning as the thrust bearing 80 is made up of a holed circular disc and has a pair of axial end faces 80a, 80b each having an annular shape.

One axial end face 80a is brought into slidable contact with the other axial end face 70b of the third member 70.

The other axial end face 80b is brought into slidable contact with the seat surface 48b of the main body 48 of the second member 38.

At least the one axial end face 80a of the thrust bearing 80 is formed of a low friction material such as a fluorine plastic, for example.

However, both the axial end faces 80a, 80b may be formed of such a low friction material.

The low friction material may be configured as a coating layer which is coated on the predetermined axial end face. Alternatively, the whole of the thrust bearing 80 may be formed of the low friction material.

A thrust ball bearing or a thrust roller bearing, not shown, can be used as the thrust bearing 80 in place of the thrust washer.

For example, a thrust needle roller bearing which is made up of a retainer and rollers may be used or a thrust needle roller bearing may be used in which rollers held by a retainer are interposed between a pair of raceway plates which face each other in the axial direction.

The thrust bearing 80, which is the friction reducing mechanism, functions to make the rotating resistance of the third member 70 relative to the second member 38 smaller than a reaction force which the third member 70 receives as a result of the rolling resistance of the balls 41.

Referring to FIG. 2, again, the first interposed member 61 and the second interposed member 62 are interposed between the nut 36 which is screwed on the one end portion of the fastening shaft 35 and the other fixed side plate 27 of the upper fixed bracket 19.

The first inter posed member 61 has a first portion 611 and a second portion 612.

The first portion 611 of the first interposed member 61 follows an outer surface of the other fixed side plate 27 of the upper fixed bracket 19.

The second portion 612 of the first interposed member 61 is fitted in the tilting slot 34 in the other fixed side plate 27 of the upper fixed bracket 19 and the telescoping slot 33 in the other column side plate 24 of the upper column bracket 18 so as to move along the direction in which each of the grooves 34, 33 extends.

Additionally, a pair of flat surfaces which define a width across flat therebetween, for example, are provided at a portion of the second portion 612 which fits in the tilting slot 34 in the fixed side plate 27, whereby the second portion 612 is restricted from rotating by the tilting slot 34.

The second interposed member 62 includes a thrust washer 63 which is interposed between the first portion 611 of the first interposed member 61 and the nut 36 and a thrusting needle roller bearing 64 which is interposed between the thrust washer 63 and the first portion 611 of the first interposed member 61.

The second interposed member 62 including the needle roller bearing 64 works to enable the nut 36 to rotate smoothly together with the fastening shaft 35.

The first member 37 rotates relative to the second member 38 as the operation lever 20 is rotated, whereby the second member 38 is moved in the axial direction Y1 of the fastening shaft 35.

The pair of fixed side plates 26, 27 of the upper fixed bracket 19 are held to be fastened between the second member 38 which has so moved and the first interposed member 61, as a result of which the fixed side plates 26, 27 of the upper fixed bracket 19 fasten the corresponding column side plates 23, 24 of the upper column bracket 18, whereby the tilting lock and the telescoping lock are attained.

According to this embodiment, the retainer 42 which holds the balls 41 is restricted from rotating about the center axis C1 of the fastening shaft 35. Additionally, the thrust bearing 80, which is the friction reducing mechanism, functions to make the rotating resistance of the third member 70 relative to the second member 38 smaller than the reaction force which the third member 70 receives as a result of the rolling resistance of the balls 41.

Consequently, when the operation lever 20 is rotated, the first member 37 rotates together with the operation lever 20, while the third member 70 which is supported rotatably via the thrust bearing 80 by the second member 38 which is restricted from rotating rotates in an opposite direction to the rotating direction of the first member 37, whereby the balls 41 are allowed to roll on the first member 37 and the third member 70 in an ensured fashion.

As a result, the operating effort to operate the operation lever 20 can be reduced.

The friction resistance of the third member 70 relative to the second member 38 can be reduced remarkably by the thrust bearing 80 functioning as the friction reducing mechanism which is interposed between the second member 38 and the third member 70.

Figure 18:
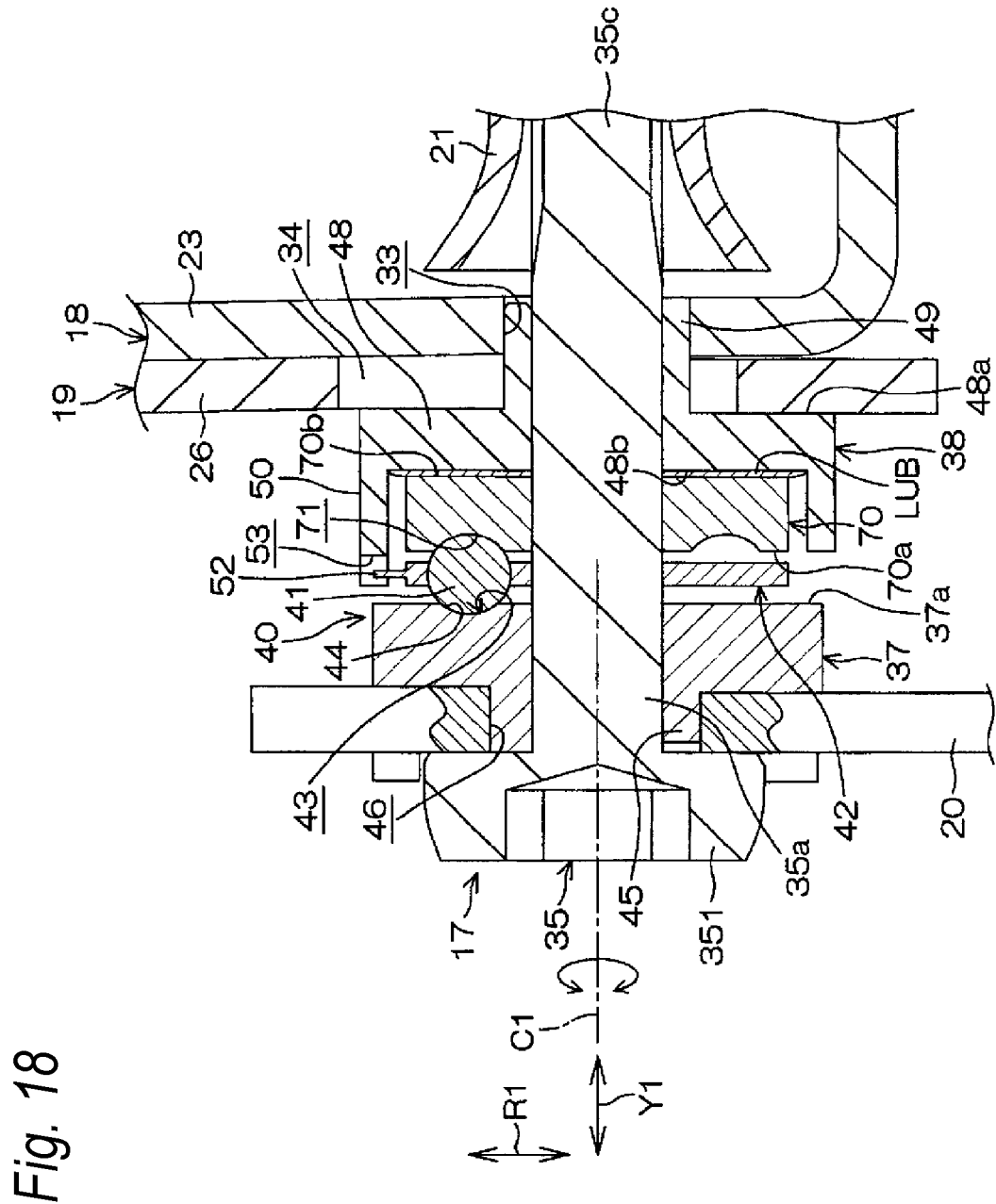
FIG. 18 is an enlarged sectional view of a fastening mechanism of a second embodiment of the invention and the periphery thereof, which shows an example in which a lubricant is used as a friction reducing mechanism.

Next, FIG. 18 shows a second embodiment of the invention.

The second embodiment shown in FIG. 18 differs from the first embodiment shown in FIG. 4 mainly in the following point.

Namely, in the first embodiment, the thrust bearing 80 is used as the friction reducing mechanism.

In contrast to the first embodiment, in the second embodiment, a lubricant LUB is interposed between (an axial end face 70b of) a third member 70 and (a seat surface 48b of a main body 48 of) a second member 38 so as to be used as a friction reducing mechanism.

A solid lubricant (for example, PTFE) is secured to at least one of (the axial end face 70b of) the third member 70 and (the seat surface 48b of the main body 48 of) the second member 38 so as to work as the lubricant LUB in addition to grease.

Like reference numerals to those given to the constituent elements of the first embodiment shown in FIG. 4 are given to like constituent elements of the second embodiment shown in FIG. 18 to those of the first embodiment shown in FIG. 4.

In the second embodiment, too, the same working effect as that of the first embodiment can be provided, whereby the operating effort to operate the operation lever 20 can be reduced.

Figure 19:
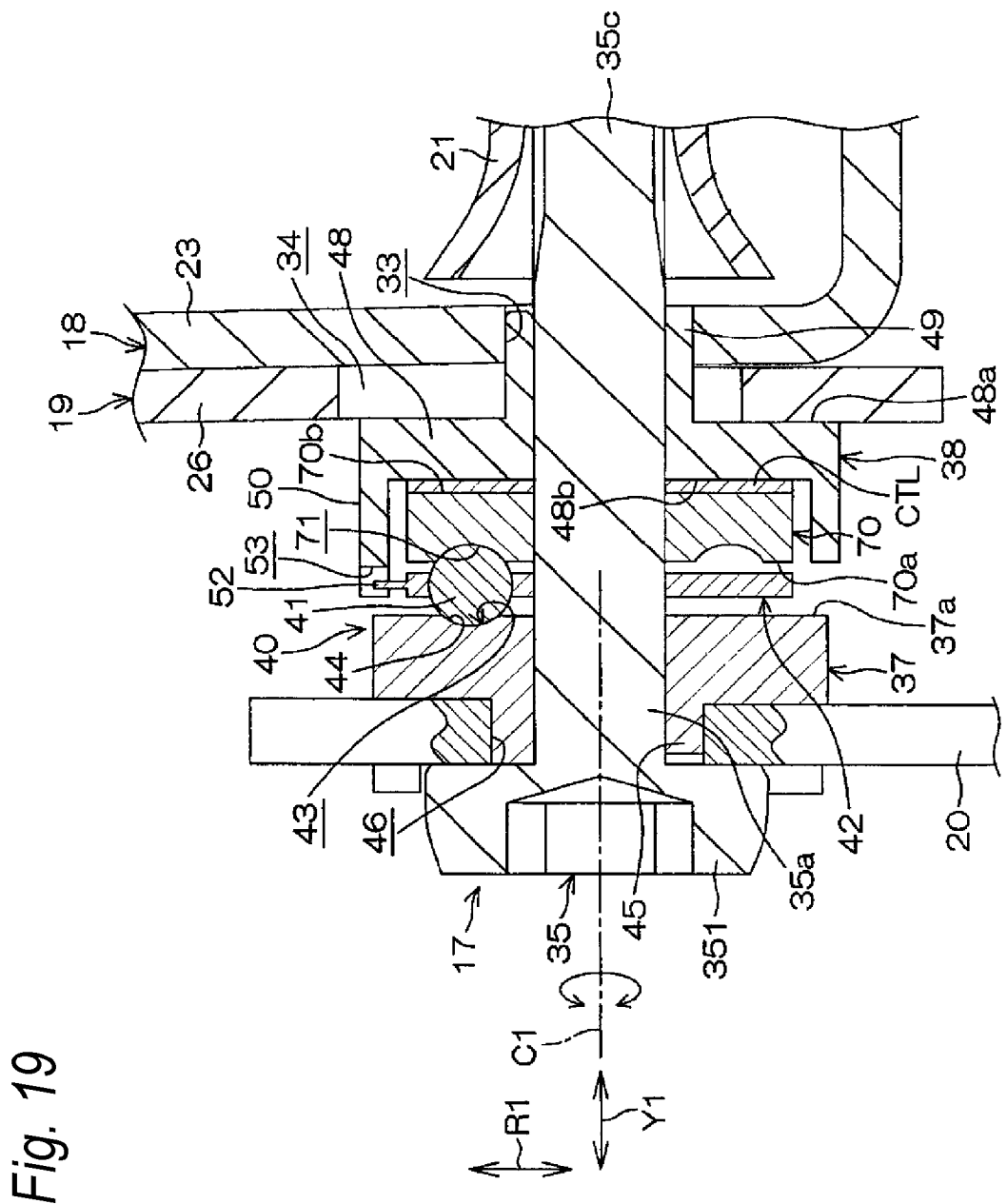
FIG. 19 is an enlarged sectional view of a fastening mechanism of a third embodiment of the invention and the periphery thereof, which shows an example in which a coating layer of a low friction material is used as a friction reducing mechanism.

Next, FIG. 19 shows a third embodiment of the invention.

The third embodiment shown in FIG. 19 differs from the first embodiment shown in FIG. 4 mainly in the following point.

Namely, in the first embodiment, the thrust bearing 80 is used as the friction reducing mechanism.

In contrast to the first embodiment, in the third embodiment, a coating layer CTL of a low friction material such as a fluorine plastic, for example, is coated on (an axial end face 70b of) a third member 70 and (a seat surface 48b of a main body 48 of) a second member 38 so as to be used as a friction reducing mechanism.

Although not shown, the coating layer CTL of the low friction material may be provided on both (the axial end face 70b of) the third member 70 and (the seat surface 48b of the main body 48 of) the second member 38.

Like reference numerals to those given to the constituent elements of the first embodiment shown in FIG. 4 are given to like constituent elements of the third embodiment shown in FIG. 19 to those of the first embodiment shown in FIG. 4.

In the third embodiment, too, the same working effect as that of the first embodiment can be provided, whereby the operating effort to operate the operation lever 20 can be reduced.

The invention is not limited to the embodiments that have been described heretofore. For example, in the embodiments, the engaging portions are the projecting portions 56, and the engaged portions are the recess portions 55. However, the invention is not limited thereto. Either of the engaging portions and the engaged portions should include projecting portions and the other should include recess portions engaging with the projecting portions.

As this occurs, since the engaging portions and the engaged portions fit in and on together or are brought into interlocking engagement with each other, compared with a case where the engaging portions and the engaged portions are brought into friction engagement with each other, the holding of the locked state can be ensured further.

Additionally, in the embodiments, the projecting portions 56 are provided on the flexible portions 57 which can elastically be deformed in the radial direction R1. However, the invention is not limited thereto. At least either of the projecting portions and the recess portions should be provided on the flexible portions which can elastically be deformed in the radial direction.

As this occurs, the projecting portions and the recess portions are brought into engagement with each other after the flexible portions are once elastically deformed in the radial direction in association with a relative rotation of at least one of the first member 37 and the second member 38 and the member which rotates relative to the one of the first and second members 37, 38, and therefore, the interlocking engagement can smoothly be executed.

Namely, in the event of the projecting portions or the recess portions being provided on a retainer which is a member rotating relatively, the flexible portions are provided on the retainer.

In the event of the flexible portions being provided on the retainer, retainer's material removed through holes may be provided in the retainer so as to form the flexible portions.

Additionally, in the event of the projecting portions or the recess portions being provided on the first member or the second member which is the member rotating relatively, the flexible portions are provided on the first member or the second member.

In the event of the flexible portions being provided on the first member or the second member, first member's or second member's material removed through holes may be provided on the first member or the second member on which the flexible members are provided.

In the embodiments that have been described above, the engaging portions (the projecting portions 56) are provided on the retainer 42, while the engaged portions (the recess portions 55) are provided on the first member 37. However, the invention is not limited thereto. Although not shown, the engaged portions (the recess portions or the projecting portions) may be provided on the second member 38 in place of the first member 37. Alternatively, the engaged portions (the recess portions or the projecting portions) may be provided on both the first member 37 and the second member 38.

In the event of the engaged portions being provided on the first member 37 and the second member 38, the engaged portions may be provided on the first stoppers 47 and the second stoppers (the projections 51).

In the embodiments that have been described above, the engaging portions (the projecting portions 56) are provided on the retainer 42. However, the invention is not limited thereto, and hence, the engaging portions and the engaged portions may not be provided on the retainer 42.

For example, the engaging portions (the projecting portions or the recess portions) which are provided on either of the first member 37 and the second member 38 and the engaged portions (the recess portions or the projecting portions) which are provided on the other of the first member 37 and the second member 38 may be provided as a relative rotation restricting mechanism which restricts the relative rotation of the first member 37 and the second member 38 when the cam mechanism 40 locks the steering shaft 4.

Figure 20:
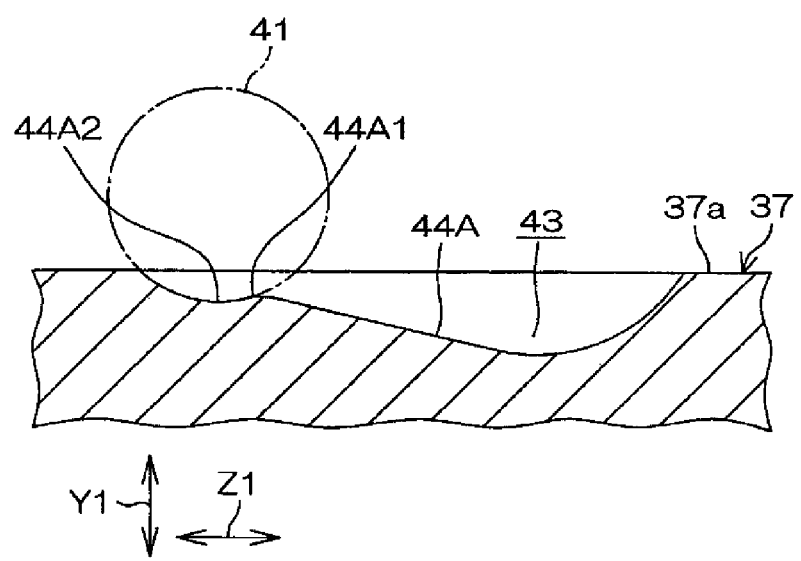
FIG. 20 is a sectional view of a holding groove of a first member of a fourth embodiment, which shows an outline of a cam surface.

In addition, as shown in a fourth embodiment depicted in FIG. 20, in the midst of a ball 41 moving on a cam surface 44A to the left (a locking side), the ball 41 may be made to be held in a locking holding portion 44A2 which makes up a shallow trough after the ball 41 rides over a ridge portion 44A1 so as to enhance the locking holding force.

Figure 21:
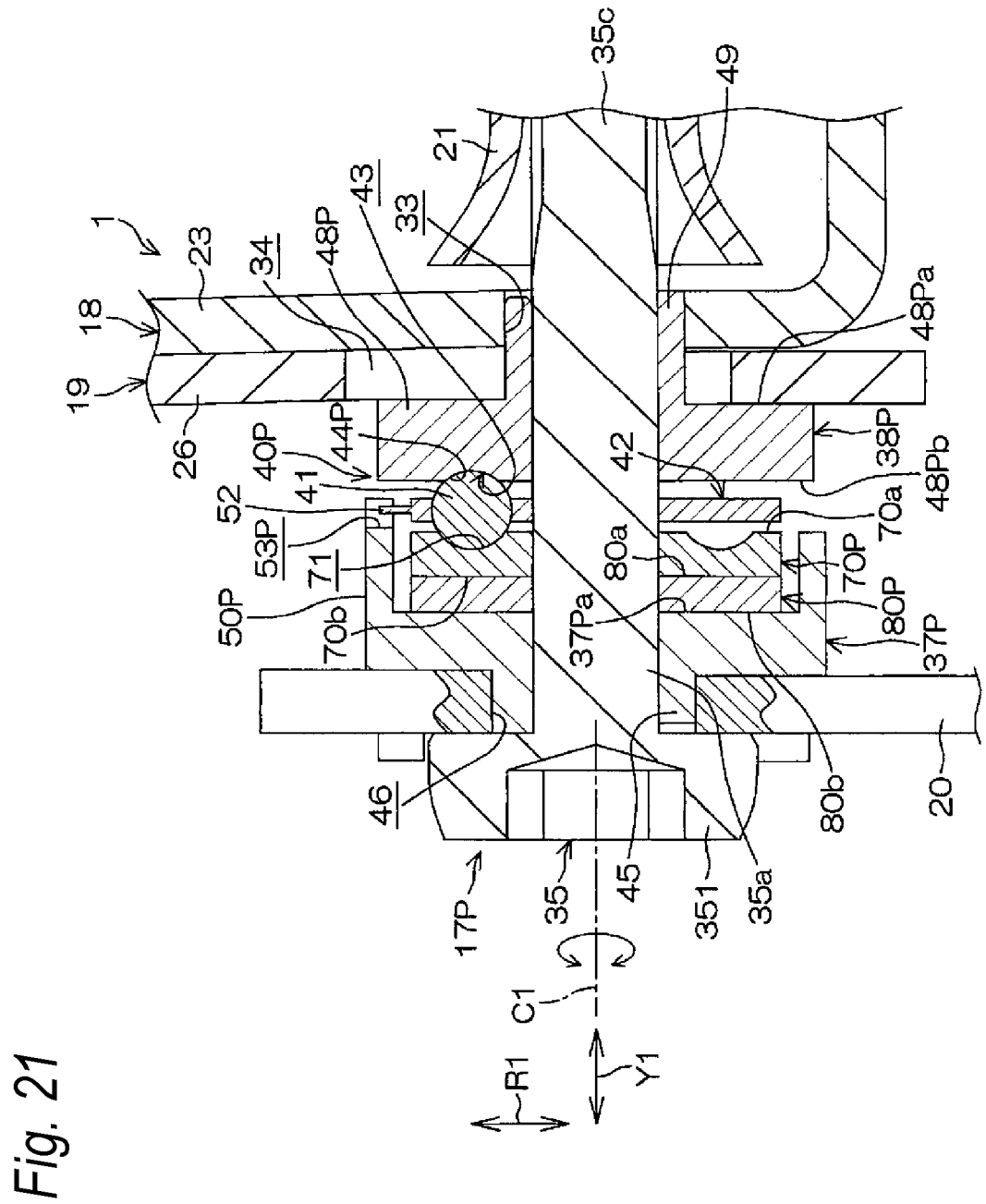
FIG. 21 is an enlarged sectional view of a fastening mechanism of a fifth embodiment and the periphery thereof.

FIG. 21 shows a fifth embodiment of the invention.

The fifth embodiment shown in FIG. 21 differs from the first embodiment shown in FIG. 4, the second embodiment shown in FIG. 18 and the third embodiment shown in FIG. 19 mainly in the following point.

Namely, in the first to third embodiments, in the fastening mechanism 17, the retainer 42 of the cam mechanism 40 is restricted from rotating by the second member 38 which cannot rotate, and the friction reducing mechanism (the thrust bearing 80, the lubricant LUB, the coating layer CTL) is interposed between the second member 38 and the third member 70.

Additionally, the cam surface 44 is provided on the first member 37.

In contrast to this, in the fifth embodiment shown in FIG. 21, in a fastening mechanism 17P, a retainer 42 of a cam mechanism 40P rotates together with a first member 37P which rotates together with an operation lever 20, and a thrust bearing 80P (a friction reducing mechanism) is interposed between the first member 37P and a third member 70P.

A cam surface 44P (which may have the same configuration as that of the cam surface 44A shown in FIG. 20) is provided on an axially facing surface 48Pb of a main body 48P of the second member 38P which lies opposite to a fastening surface 48Pa of the main body 48P.

Specifically, a circumferential side wall 50P is provided which extends from an outer circumferential edge of the first member 37P towards an opposite side (towards a second member 38P) to a side where a fitting projecting portion 45 is provided.

An engaging projection 52 of the retainer 42 is in engagement with an engaging groove 53P of the circumferential side wall 50P.

A flat and annular seat surface 37Pa of the first member 37P bears the thrust bearing 80P (the friction reducing mechanism).

Like reference numerals to those given to the constituent elements of the first embodiment shown in FIG. 4 are given to like constituent elements of the fifth embodiment shown in FIG. 21 to those of the first embodiment shown in FIG. 4.

According to the fifth embodiment, the retainer 42 which holds balls 41 (rolling elements) rotates together with the first member 37P, and the balls 41 roll on the cam surface 44P of the second member 38P.

The thrust bearing 80 (the friction reducing mechanism) functions to make the rotating resistance of the third member 70P relative to the first member 37P smaller than a reaction force which the third member 70P receives as a result of the rolling resistance of the balls 41.

Consequently, when the operation lever 20 is rotated, the first member 37P rotates together with the operation lever 20, while the thrust bearing 80P (the friction reducing mechanism) which is interposed between the first member 37P and the third member 70P permits the relative rotation between the first member 37P and the third member 70P, whereby the balls 41 are allowed to roll on the first member 37P and the third member 70P in an ensured fashion.

As a result, the operating effort to operate the operation lever 20 can be reduced.

In the fifth embodiment, a lubricant or a coating layer of a low friction material may be used as the friction reducing mechanism in place of the thrust bearing 80P.

In addition, in this invention, various modifications can be made without departing from the scope of claims of the invention, and hence, for example, rollers can be used in place of the balls as the rolling elements.

INDUSTRIAL APPLICABILITY

According to the invention, a steering apparatus is provided which can reduce the operating effort to operate an operation lever.

REFERENCE SIGNS LIST 1 steering apparatus
2 steering member
3 steering mechanism
4 steering shaft (steering shaft)
8 steering column
11 outer tube
12 inner tube
14 body
17, 17P fastening mechanism
18 upper column bracket
19 upper fixed bracket
20 operation lever
23, 24 column side plates
26, 27 fixed side plates
33 telescoping slot (fastening shaft insertion slot)
34 tilting slot (fastening shaft insertion slot)
35 fastening shaft
37, 37P first member
37a axially facing surface
38, 38P second member
40, 40P cam mechanism
41 ball (rolling element)
42 retainer
43 holding groove
44, 44A, 44P cam surface
48Pb axially facing surface
70, 70P third member
70a axially facing surface
71 guide groove
80, 80P thrust bearing (friction reducing mechanism)
C1 center axis (of fastening shaft)
CTL coating layer
LUB lubricant
R1 radial direction
X1 axial direction (of steering shaft)
Y1 axial direction (of fastening shaft)
Z1 circumferential direction

The invention claimed is:
1. A steering apparatus comprising:
a fixed side plate which is fixed to a body;

a column side plate which is fixed to a steering column which supports a steering shaft rotatably;

a fastening shaft which is inserted through fastening shaft insertion slots which are respectively provided in the fixed side plate and the column side plate;

an operation lever which is operated to rotate about a center axis of the fastening shaft;

a first member which is supported by the fastening shaft and which rotates about the center axis together with the operation lever;

a second member which is supported by the fastening shaft and which is restricted from rotating by the fastening shaft insertion slots;

a third member which is supported by the fastening shaft and which is interposed between the first member and the second member;

a friction reducing mechanism which is interposed between the second member and the third member and which thrust supports the third member so that the third member rotates relative to the second member; and a cam mechanism which attains locking by fastening the fixed side plate to the column side plate and which includes a pair of axially facing surfaces which are provided on the first member and the third member and which face each other in an axial direction of the fastening shaft, a cam surface which is formed on an axially facing surface of the first member, a plurality of rolling elements which roll between both axially facing surfaces in association with a relative rotation of the first member and the third member, and a retainer which holds the rolling elements and which is restricted from rotating about the center axis by the second member, wherein the friction reducing mechanism functions to make a rotating resistance of the third member relative to the second member smaller than a reaction force which the third member receives as a result of a rolling resistance of the rolling elements.

2. The steering apparatus according to claim 1, wherein the friction reducing mechanism is a thrust bearing.

3. The steering apparatus according to claim 1, wherein the friction reducing mechanism is a lubricant.

4. The steering apparatus according to claim 1, wherein the friction reducing mechanism is a coating layer having a low friction property.

5. A steering apparatus comprising:

a fixed side plate which is fixed to a body;

a column side plate which is fixed to a steering column which supports a steering shaft rotatably;

a fastening shaft which is inserted through fastening shaft insertion slots which are respectively provided in the fixed side plate and the column side plate;

an operation lever which is operated to rotate about a center axis of the fastening shaft;

a first member which is supported by the fastening shaft and which rotates about the center axis together with the operation lever;

a second member which is supported by the fastening shaft and which is restricted from rotating by the fastening shaft insertion slots;

a third member which is supported by the fastening shaft and which is interposed between the first member and the second member;

a friction reducing mechanism which is interposed between the first member and the third member and which thrust supports one of the first member and the third member so that the third member rotates relative to the other; and a cam mechanism which attains locking by fastening the fixed side plates to the column side plates and which includes a pair of axially facing surfaces which are provided on the second member and the third member and which face each other in an axial direction of the fastening shaft, a cam surface which is formed on an axially facing surface of the second member, a plurality of rolling elements which roll between both axially facing surfaces in association with a relative rotation of the second member and the third member, and a retainer which holds the rolling elements and which rotates together with the first member, wherein the friction reducing mechanism functions to make a relative rotating resistance between the first member and the third member smaller than a reaction force which the third member receives as a result of a rolling resistance of the rolling elements.

6. The steering apparatus according to claim 5, wherein the friction reducing mechanism is a thrust bearing.

7. The steering apparatus according to claim 5, wherein the friction reducing mechanism is a lubricant.

8. The steering apparatus according to claim 5, wherein the friction reducing mechanism is a coating layer having a low friction property.

* * * * *